(12) United States Patent
Iemura et al.

(10) Patent No.: US 12,617,260 B2
(45) Date of Patent: *May 5, 2026

(54) VEHICLE BODY LOWER PART STRUCTURE

(71) Applicant: HONDA MOTOR CO., LTD., Tokyo (JP)

(72) Inventors: Yu Iemura, Wako (JP); Ken Yasui, Wako (JP); Masaaki Tatsuwaki, Wako (JP); Satoru Kawabe, Wako (JP); Satoshi Yaita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 254 days.

This patent is subject to a terminal disclaimer.

(21) Appl. No.: 18/242,551

(22) Filed: Sep. 6, 2023

(65) Prior Publication Data

US 2024/0109408 A1      Apr. 4, 2024

(30) Foreign Application Priority Data

Sep. 30, 2022     (JP) ................................. 2022-158038

(51) Int. Cl.
   *B60K 1/04*          (2019.01)
   *B62D 25/02*         (2006.01)
   *B62D 21/15*         (2006.01)

(52) U.S. Cl.
   CPC .............. *B60K 1/04* (2013.01); *B62D 25/025* (2013.01); *B60K 2001/0438* (2013.01); *B62D 21/157* (2013.01)

(58) Field of Classification Search
   CPC .............. B60K 1/04; B60K 2001/0438; B62D 25/025; B62D 21/157; B62D 25/20; B62D 25/2036
   See application file for complete search history.

(56) References Cited

U.S. PATENT DOCUMENTS

| | | | |
|---|---|---|---|
| 7,654,352 | B2 | 2/2010 | Takasaki et al. |
| 9,809,101 | B2 * | 11/2017 | Ikeda ................... B62D 29/001 |
| 10,099,546 | B2 * | 10/2018 | Hara ........................ B60K 1/04 |

(Continued)

FOREIGN PATENT DOCUMENTS

| | | |
|---|---|---|
| DE | 102021106801 | 9/2022 |
| JP | 07-179185 | 7/1995 |

(Continued)

OTHER PUBLICATIONS

Japanese Office Action for Japanese Patent Application No. 2022-158048 mailed Nov. 11, 2025.
Non-Final Office Action for U.S. Appl. No. 18/242,041 mailed Nov. 5, 2025.

(Continued)

*Primary Examiner* — Justin Holmes
(74) *Attorney, Agent, or Firm* — Amin, Turocy & Watson, LLP

(57)          ABSTRACT

A vehicle body lower part structure includes: a side frame that connects a side sill to a battery pack that is arranged below a floor portion; and a battery frame that supports a battery within the battery pack. A first joint flange that is joined to a case bottom portion of the side frame is arranged such that a second joint flange that is joined to the case bottom portion of the battery frame overlaps an upper side in an upward-downward direction of the first joint flange.

9 Claims, 7 Drawing Sheets

(56)          References Cited

U.S. PATENT DOCUMENTS

| | | | |
|---|---|---|---|
| 2018/0237075 A1 | 8/2018 | Kawabe et al. | |
| 2019/0009662 A1* | 1/2019 | Toyota | B60L 50/64 |
| 2019/0359047 A1 | 11/2019 | Tsuyuzaki et al. | |
| 2021/0276621 A1* | 9/2021 | Suzaki | B60K 1/04 |
| 2021/0300481 A1 | 9/2021 | Jeong | |
| 2022/0144063 A1 | 5/2022 | Tatsuwaki et al. | |
| 2022/0144064 A1 | 5/2022 | Tatsuwaki et al. | |
| 2022/0153111 A1 | 5/2022 | Tatsuwaki et al. | |
| 2022/0153112 A1 | 5/2022 | Tatsuwaki et al. | |
| 2022/0258585 A1 | 8/2022 | Yaita et al. | |
| 2022/0258620 A1 | 8/2022 | Iemura et al. | |
| 2024/0017770 A1 | 1/2024 | Yoshida | |
| 2024/0109594 A1* | 4/2024 | Iemura | B62D 21/157 |
| 2025/0313269 A1 | 10/2025 | Saito et al. | |

FOREIGN PATENT DOCUMENTS

| | | |
|---|---|---|
| JP | 3132261 | 2/2001 |
| JP | 2018-131133 | 8/2018 |
| JP | 2018-188106 | 11/2018 |
| JP | 2019-202747 | 11/2019 |
| JP | 2022-077194 | 5/2022 |
| JP | 2022-081180 | 5/2022 |
| JP | 2022-086647 | 6/2022 |
| JP | 2022-124297 | 8/2022 |
| WO | 2018/212161 | 11/2018 |

OTHER PUBLICATIONS

Japanese Office Action for Japanese Patent Application No. 2022-158038 mailed Aug. 26, 2025.

* cited by examiner

VEHICLE BODY LOWER PART STRUCTURE

CROSS-REFERENCE TO RELATED APPLICATION

Priority is claimed on Japanese Patent Application No. 2022-158038, filed on Sep. 30, 2022, the contents of which are incorporated herein by reference.

BACKGROUND

Field of the Invention

The present invention relates to a vehicle body lower part structure.

Background

As a vehicle body lower part structure, a structure is known in which a battery case that accommodates a plurality of batteries inside the battery case is arranged below a floor portion of a vehicle. As a vehicle body lower part structure, a structure is known in which both side portions in a vehicle width direction of a battery case are provided on a pair of side sills at a lower side of a vehicle body side part.

In this type of vehicle, in order to ensure collision safety performance, it is important to protect a high-voltage battery in the battery case when a collision load is input to a vehicle body.

Accordingly, in order to protect the battery, a vehicle body lower part structure has been proposed in which an easily pressure-broken portion (a portion that is easily broken by pressure) such as a bead is provided on a cross member connected to a side sill in a region that is located at an outer position in a vehicle width direction than that of the battery case (for example, refer to Japanese Patent No. 3132261).

In the vehicle body lower part structure, the cross member starts breaking by pressure from the easily pressure-broken portion when a collision load toward the inside in the vehicle width direction is input to the side sill from a vehicle lateral direction. Therefore, it is possible to absorb collision energy before the impact load deforms the battery case.

SUMMARY

However, in the above vehicle body lower part structure of the related art, after the easily pressure-broken portion is broken by pressure at the time of input of a collision load, the easily pressure-broken portion forms a mass and is displaced in the direction of the battery. Therefore, there is a concern that the load is transmitted from the easily pressure-broken portion to the battery, and the battery is damaged. Accordingly, there is room for improvement in terms of collision safety performance.

An aspect of the present invention aims at providing a vehicle body lower part structure capable of efficiently absorbing collision energy while preventing damage to a mounted battery at the time of input of a collision load. The aspect of the present invention aims at providing a vehicle body lower part structure that can improve collision safety performance and can contribute to the development of a sustainable transportation system.

A vehicle body lower part structure according to an aspect of the present invention includes: a side frame that connects a side sill to a battery pack that is arranged below a floor portion; and a battery frame that supports a battery within the battery pack, wherein a first joint flange that is joined to the battery pack of the side frame is arranged such that a second joint flange that is joined to the battery pack of the battery frame overlaps an upper side in an upward-downward direction of the first joint flange.

According to such a configuration, the second joint flange is arranged at the upper side in the upward-downward direction of the first joint flange so as to overlap the first joint flange. The first joint flange and the second joint flange are formed to accept deformation with respect to a collision load. Hereinafter, a region including the first joint flange and the second joint flange may be referred to as a "collision absorption portion".

Here, for example, when a collision load is input to the first joint flange of the side frame by a side collision such as a pole side collision, the first joint flange is pressed by the second joint flange from above. Thereby, it is possible to allow the collision absorption portion to be deformed downward by the collision load. Hereinafter, a side collision such as a pole side collision may be simply abbreviated as a "side collision".

It is possible to ensure a space that receives deformation of the collision absorption portion below the collision absorption portion. Therefore, it is possible to prevent a section that is not collapsed from being generated at the collision absorption portion, and it is possible to enhance the absorption efficiency of collision energy. The collision absorption portion is deformed downward, and thereby, it is possible to prevent the collision absorption portion from coming into contact with the battery arranged within the battery pack.

Thereby, it is possible to efficiently absorb the collision energy while preventing damage to the mounted battery at the time of input of the collision load. Therefore, according to the present vehicle body lower part structure, it is possible to improve collision safety performance, and it is possible to contribute to the development of a sustainable transportation system.

In the aspect described above, the battery frame may include a protrusion portion that protrudes upward from a bend portion formed on an inner end portion in a vehicle width direction of the second joint flange, an edge portion on the battery side of the first joint flange may extend to the bend portion side, and the edge portion may include a first joint section that is joined to the battery pack.

According to such a configuration, the edge portion of the first joint flange extends to the bend portion side (that is, to the inside in the vehicle width direction) of the battery frame, and the first joint section of the edge portion is joined to the battery pack. Therefore, the collision load can be transmitted to the bend portion of the battery frame. Thereby, the bend portion can be a base point of folding with respect to the collision load, and it is possible to further reliably deform (bend) the first joint flange downward together with the battery frame.

In the aspect described above, the second joint flange may include a second joint section that is joined to the battery pack, and the first joint section may be arranged closer to the battery than the second joint section.

According to such a configuration, the second joint section of the second joint flange is joined to the battery pack, and the first joint section is arranged closer to the battery (that is, at the inside in the vehicle width direction) than the second joint section. The second joint flange is arranged at an upper side of the battery pack, and the first joint flange is arranged at a lower side of the battery pack. Thereby, it is possible to prevent the first joint flange from coming into contact directly with the battery.

Specifically, for example, it is also conceivable that when an excessive collision load is input to the first joint flange of the side frame due to the side collision, the first joint flange may be deformed upward. Even in this case, the edge portion (that is, the first joint section) is in contact with the battery frame. Therefore, the battery frame can prevent the first joint flange from being greatly deformed upward. Thereby, it is possible to protect the battery by the battery frame.

In the aspect described above, the battery frame may form a hollow cross-section together with the battery pack at the protrusion portion, and the battery may be fastened to an inner end section in the vehicle width direction of the protrusion portion of the battery frame.

According to such a configuration, the battery is fastened to the inside in the vehicle width direction of the protrusion portion. Therefore, at the time of a side collision, a region of the protrusion portion from a middle side in the vehicle width direction to the outside in the vehicle width direction can be bent in a mountain fold. Thereby, when the first joint flange is deformed downward, and the edge portion is folded in a valley form, the protrusion portion can be bent in a mountain fold in cooperation with the valley fold of the edge portion. That is, downward deformation of the battery pack by the outside region (that is, the collision absorption portion) of the battery can be preferably guided. Accordingly, it is possible to enhance the absorption efficiency of the collision energy by the collision absorption portion, and it is possible to suitably prevent the collision absorption portion from coming into contact with the battery.

In the aspect described above, the protrusion portion of the battery frame may include a plurality of recess sections that are joined to the battery pack along a vehicle forward-rearward direction.

According to such a configuration, the recess section that is joined to the battery pack is provided on the protrusion portion, and the recess section can be arranged at the middle side in the width direction of the protrusion portion. Therefore, the rigidity at the middle side in the width direction of the protrusion portion can be enhanced by the recess section, and it is possible to provide a strength difference relative to the outer region (that is, a region on the bend portion side) in the width direction. Thereby, the bend portion can be further reliably used as a base point of folding, and the first joint flange can be further reliably deformed (bent) downward.

In the aspect described above, the battery frame may include a plurality of ridge lines that continue to the second joint flange and an outer surface section on an outside in the vehicle width direction of the protrusion portion, extend in the vehicle width direction, and are spaced from each other in a vehicle forward-rearward direction.

According to such a configuration, the plurality of ridge lines are formed on the battery frame continuously to the second joint flange and the outer surface section of the protrusion portion, and the plurality of ridge lines are arranged to be spaced from each other in the vehicle forward-rearward direction. Therefore, the rigidity of the second joint flange can be enhanced against a collision load input by a side collision. Thereby, it is possible to increase the absorption amount of the collision energy by the collision absorption portion including the second joint flange.

In the aspect described above, the side frame may include: a horizontal portion that is fixed to a lower portion of the side sill; and a vertical portion that connects the horizontal portion to the first joint flange, the horizontal portion and vertical portion may be formed as hollow portions having a substantially L shape in a cross-section including a plurality of hollow cells, and the second joint flange of the battery frame may be arranged at a position that is separated inward in a vehicle width direction from the vertical portion.

According to such a configuration, the horizontal portion and the vertical portion of the side frame are formed as hollow portions having a substantially L shape in a cross-section, and the hollow portion includes the plurality of hollow cells. The hollow portion is formed to have high rigidity against a collision load input by a side collision. Therefore, by separating the second joint flange of the battery frame inward in the vehicle width direction relative to the vertical portion (that is, the hollow portion), the battery frame and the hollow portion can be spaced from each other. Thereby, it is possible to suitably ensure a deformation margin of the collision absorption portion against a collision load input by a side collision, and it is possible to further increase the absorption amount of the collision energy.

In the aspect described above, a lower surface of the horizontal portion may be formed such that a thickness of an inner region formed on the vertical portion side is thinner than an outer region formed on an outside in the vehicle width direction.

According to such a configuration, when the collision load is input by a side collision, the inner region on the vertical portion side can be actively deformed at the lower surface of the horizontal portion by the collision load. Accordingly, a boundary portion between the vertical portion and the first joint flange can be deformed upward by a collision load. Thereby, the side frame can be suitably deformed, and it is possible to further increase the absorption amount of the collision energy.

In the aspect described above, a lower surface of the horizontal portion may be arranged at a lower position than a lower surface of the battery pack, a lower surface of the vertical portion may be formed in an inclination form having an upward gradient toward the first joint flange from the lower surface of the horizontal portion, and the lower surface of the vertical portion may connect the lower surface of the horizontal portion to the first joint flange.

According to such a configuration, the lower surface of the horizontal portion is arranged at a lower position than the lower surface of the battery pack. Therefore, it is possible to prevent the hollow portion of the side frame from falling to a room inside (that is, inward in the vehicle width direction) by a collision load input by a side collision. Thereby, the first joint flange of the side frame can be further reliably deformed downward.

In the aspect described above, the battery may be formed in a rectangle shape in plan view and be arranged within the battery pack such that a long side is directed in a vehicle forward-rearward direction.

According to such a configuration, the battery is arranged within the battery pack such that the long side of the battery is directed in the vehicle forward-rearward direction. Therefore, for example, the size in the vehicle width direction of the battery can be small compared to the case where batteries of the same number and the same size are arranged such the long side is directed in the vehicle width direction. That is, the size in the vehicle width direction of the battery can be short without reducing the battery capacity of the battery.

Thereby, it is possible to ensure a long deformation stroke of the collision absorption portion located between the hollow portion of the side frame and the battery. Further, by the support member of the battery being small in the vehicle width direction, it is possible to reduce the weight of the vehicle, and by ensuring the battery capacity of the battery, it is possible to sufficiently ensure a cruising distance of the vehicle.

According to an aspect of the present invention, it is possible to efficiently absorb collision energy while preventing damage to the mounted battery at the time of input of a collision load. Therefore, it is possible to improve collision safety performance and contribute to the development of a sustainable transportation system.

DESCRIPTION OF EMBODIMENTS

Figure 1:
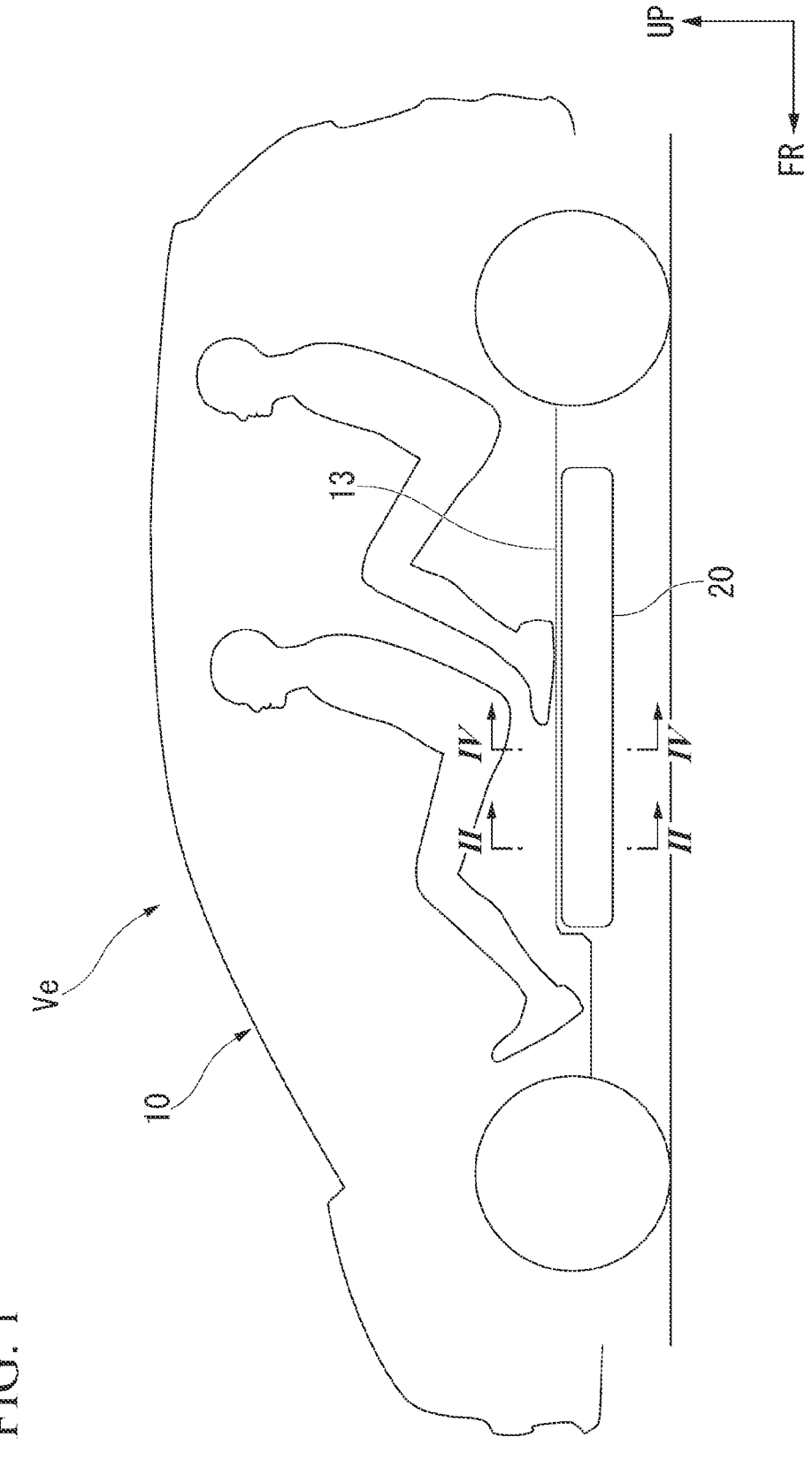
FIG. 1 is a schematic view showing a battery pack mount vehicle that includes a vehicle body lower part structure in an embodiment of the present invention when seen from a leftward direction.

Hereinafter, a battery pack mount vehicle having a vehicle body lower part structure according to an embodiment of the present invention will be described with reference to the drawings. In the drawings, an arrow FR indicates a vehicle forward direction, an arrow UP indicates a vehicle upward direction, and an arrow LH indicates a vehicle leftward direction. The battery pack mount vehicle has a structure that is generally symmetric in a leftward-rightward direction.

Accordingly, the following embodiment is described using the same reference numerals for the left and right configuration members.

Figure 2:
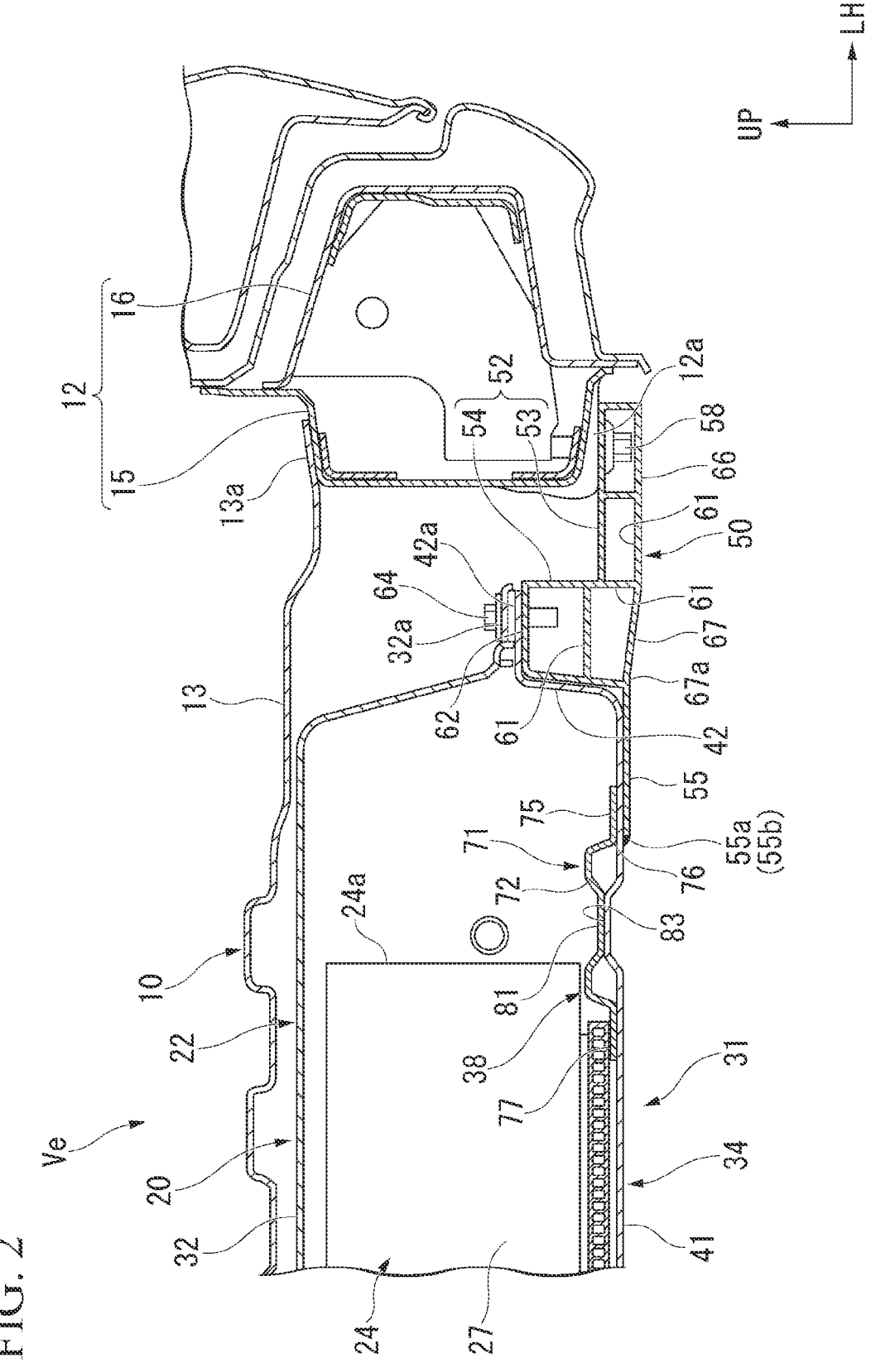
FIG. 2 is a cross-sectional view along a II-II line of FIG. 1.

FIG. 1 is a schematic view showing a battery pack mount vehicle Ve that includes a vehicle body lower part structure when seen from a leftward direction. FIG. 2 is a cross-sectional view along a II-II line of FIG. 1.

As shown in FIG. 1 and FIG. 2, the battery pack mount vehicle Ve includes: a vehicle body 10; a battery pack 20 that is arranged at a lower middle of the vehicle body 10; and a left side frame 50 and a right side frame 50 that connect the battery pack 20 and the vehicle body 10. Hereinafter, the battery pack mount vehicle Ve may be abbreviated as a "vehicle Ve".

<Vehicle Body>

The vehicle body 10 includes a left side sill (side sill) 12, a right side sill (side sill, not shown), and a floor portion 13.

The left side sill 12 and the right side sill (not shown) have a configuration that is generally symmetric in the leftward-rightward direction.

Therefore, the following embodiment is described by abbreviating the left side sill 12 as a "side sill", and description of the right side sill (not shown) is omitted.

In the side sill 12, a closed cross-section is formed by overlapping open sides of an inner panel 15 and an outer panel 16 that are formed in a C shape when seen from a vehicle forward-rearward direction with each other. The inner panel 15 is arranged at an inside in a vehicle width direction, and the outer panel 16 is arranged at a left outside in the vehicle width direction. The side sill 12 is a member having high rigidity that constitutes part of a skeleton of the vehicle body 10. The side sill 12 is provided at the left outside in the vehicle width direction (at the outside in the vehicle width direction) relative to the battery pack 20.

The side sill 12 extends in the vehicle forward-rearward direction along the left outside in the vehicle width direction of the floor portion 13.

A left outer section 13a of the floor portion 13 is provided on the side sill 12. The floor portion 13 forms a floor of the vehicle body 10.

The battery pack 20 is fixed to the side sill 12, the floor portion 13, and the like. The side sill 12, the floor portion 13, the battery pack 20, and the like constitute the vehicle body lower part structure.

<Battery Pack>

Figure 3:
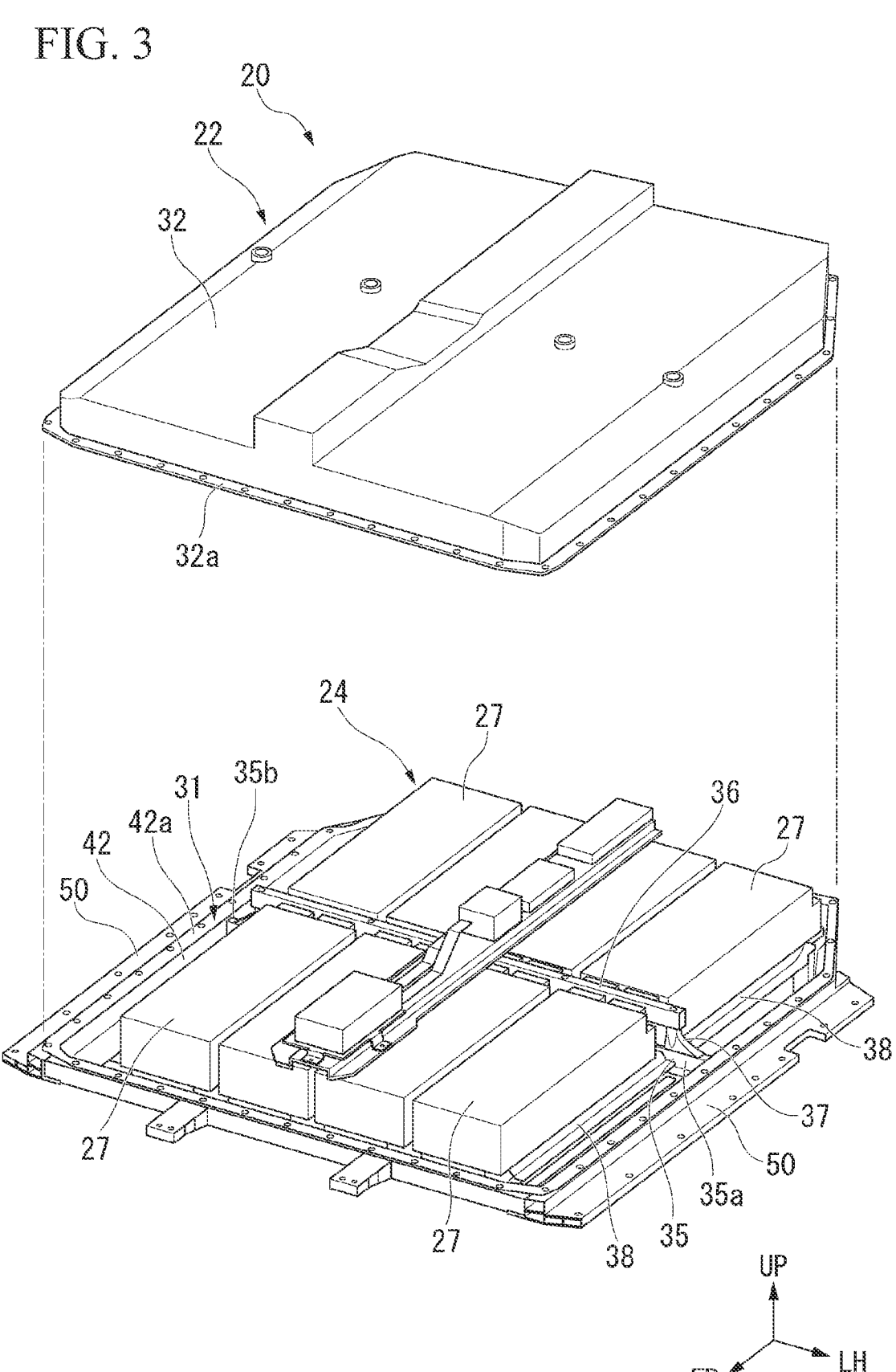
FIG. 3 is a perspective view showing a state in which a case cover is disassembled from a battery pack in the embodiment of the present invention.

FIG. 3 is a perspective view showing a state in which a case cover 32 is disassembled from the battery pack 20.

As shown in FIG. 2 and FIG. 3, the battery pack 20 is arranged below the floor portion 13 (that is, below the floor of the vehicle Ve shown in FIG. 1). The battery pack 20 includes a battery case 22 and a battery module 24.

<Battery Case>

The battery case 22 includes: a case main body 31; and the case cover 32 that covers the case main body 31 from above, opens at the case main body 31 side, and has a box shape. The case main body 31 includes: a case portion 34 that is provided below the battery module 24; a lower cross member 35 that is provided on the case portion 34; an upper cross member 36 that is arranged above the lower cross member 35; a plurality of connection portions 37 that connect the upper cross member 36 arranged above the lower cross member 35; and a plurality of battery frames 38 that support the battery module 24.

The case portion 34 has a case bottom portion 41 and a case circumferential wall 42. The case bottom portion 41 is arranged below the battery module 24. The case bottom portion 41 is formed in a substantially rectangular shape in plan view. The case bottom portion 41 forms a bottom portion of the battery case 22.

The case circumferential wall 42 is formed along an outer circumference of the case bottom portion 41. A flange portion 42a is formed integrally on the case circumferential wall 42 such that the flange portion 42a extends outward. A flange portion 32a of the case cover 32 is arranged so as to overlap the flange portion 42a. The lower cross member 35, the upper cross member 36, the plurality of connection portions 37, and the plurality of battery frames 38 are provided within the battery pack 20.

Figure 4:
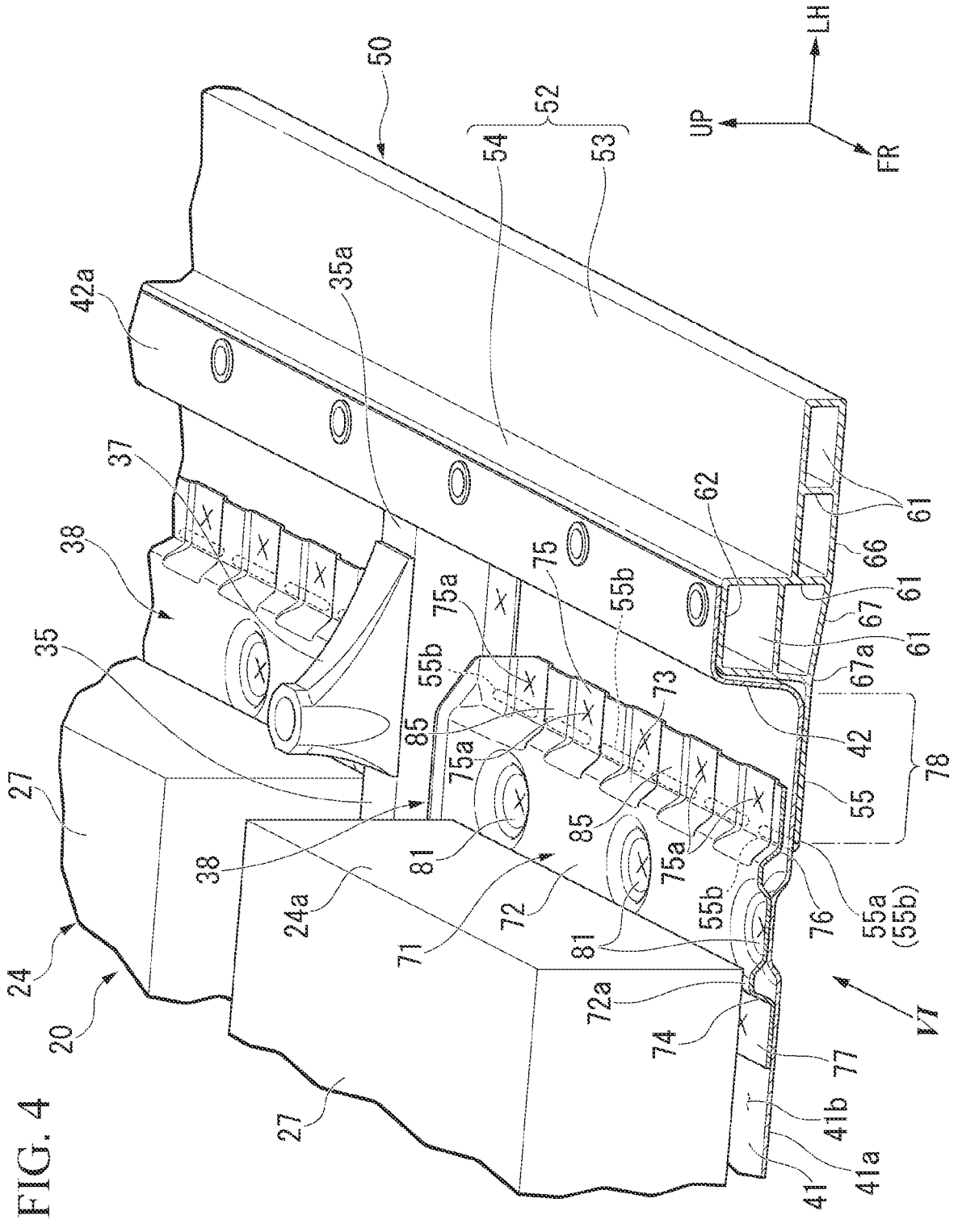
FIG. 4 is a broken perspective view along a IV-IV line of FIG. 1.
Figure 5:
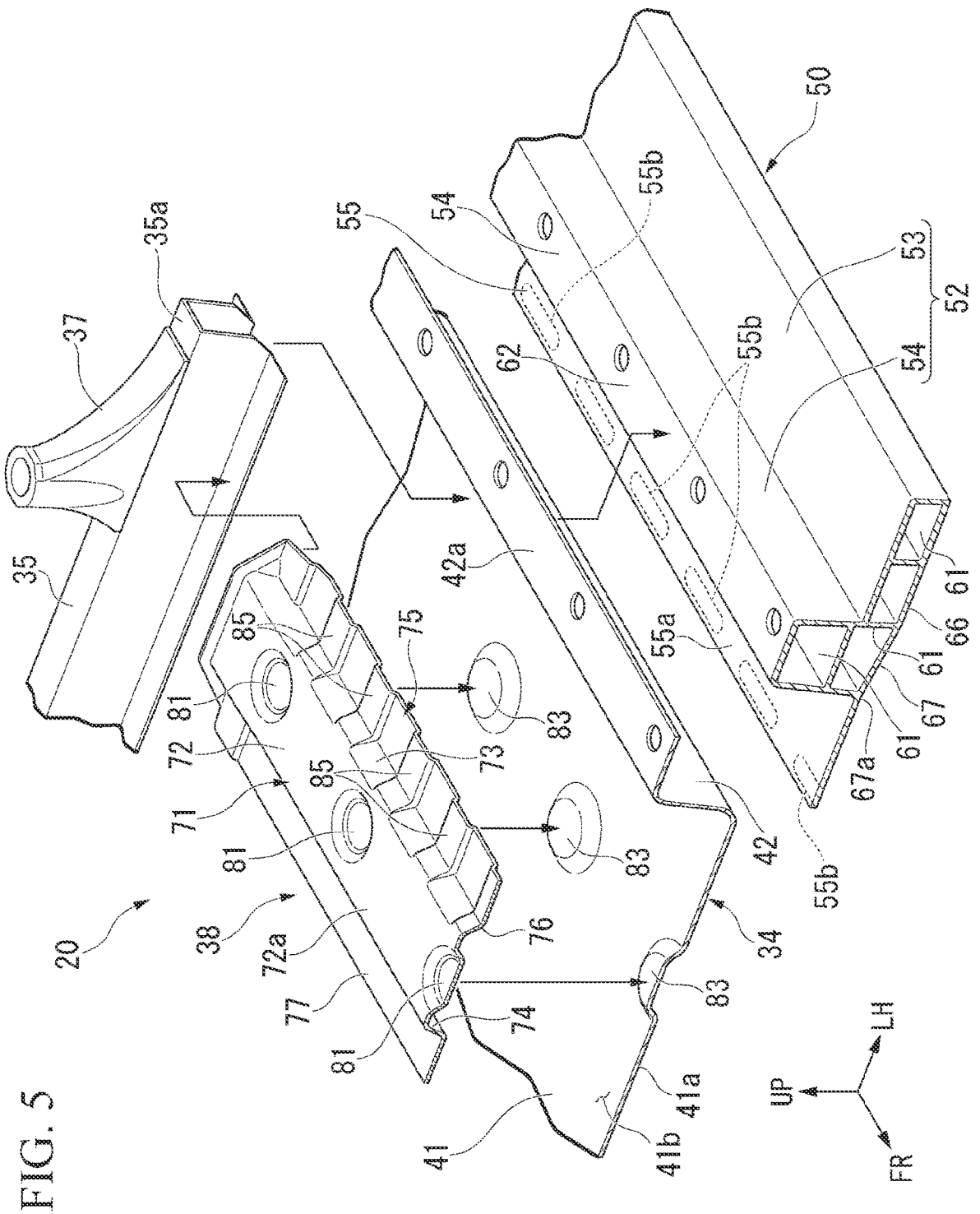
FIG. 5 is a perspective view in which a lower cross member, a battery frame, and a side frame are disassembled from a battery case in the embodiment of the present invention.

FIG. 4 is a broken perspective view along a IV-IV line of FIG. 1. FIG. 5 is a perspective view in which the lower cross member 35, the battery frame 38, and the side frame 50 are disassembled from the battery case 22.

As shown in FIG. 4 and FIG. 5, the lower cross member 35 is provided on the case portion 34 (particularly, the case bottom portion 41). The lower cross member 35 is arranged at a middle in the vehicle forward-rearward direction in the case portion 34 and extends toward the vehicle width direction. For example, a right end portion 35a of the lower cross member 35 is in contact with a right wall of the case circumferential wall 42. For example, a left end portion 35a (refer to FIG. 3) of the lower cross member 35 is in contact with a left wall of the case circumferential wall 42. The plurality of battery frames 38 are provided on the case bottom portion 41 at a vehicle body forward position and a vehicle body rearward position of the lower cross member 35.

The upper cross member 36 is arranged above the lower cross member 35 and is provided along the lower cross member 35. The plurality of connection portions 37 are interposed between the upper cross member 36 and the lower cross member 35 such that the connection portions 37 are spaced from each other in the vehicle width direction.

The plurality of connection portions 37 are members that connect the lower cross member 35 to the upper cross member 36 in an upward-downward direction. Only the connection portion 37 on the left outside in the vehicle width direction of the plurality of connection portions 37 is shown in the drawings.

The upper cross member 36, the plurality of connection portions 37, and the lower cross member 35 are joined together by an attachment bolt (not shown) that penetrates through the upper cross member 36, the plurality of connection portions 37, and the lower cross member 35. In this state, the upper cross member 36 fixes the battery module 24 from above.

The lower cross member 35, the plurality of connection portions 37, and the upper cross member 36 are connected in the upward-downward direction to the floor portion 13 (refer to FIG. 2) and a floor frame (not shown) by a fastening member 45 (refer to FIG. 6) such as a bolt and a nut. The floor frame (not shown) is a member having high rigidity that is joined to an upper surface of the floor portion 13. The battery frame 38 is described later.

<Side Frame>

As shown in FIG. 2 and FIG. 3, by connecting the battery pack 20 to the left side sill 12, the left side frame 50 can arrange the battery pack 20 such that the battery pack 20 is separated inward in the vehicle width direction from the side sill 12. By connecting the battery pack 20 to the right side sill 12 (not shown), the right side frame 50 can arrange the battery pack 20 such that the battery pack 20 is separated inward in the vehicle width direction from the side sill 12. The left side frame 50 and the right side frame 50 have a configuration that is generally symmetric in the leftward-rightward direction. Therefore, the following embodiment is described by abbreviating the left side frame 50 as a "side frame 50", and description of the right side frame 50 is omitted.

As shown in FIG. 2, FIG. 4, and FIG. 5, the side frame 50 is arranged to be spaced to the left side in the vehicle width direction from a left side 24a (left outer side of the battery 27 described later) of the battery module 24. The side frame 50 extends in the vehicle forward-rearward direction along the side sill 12 and the battery pack 20.

The side frame 50 includes: a horizontal portion 53 that is fixed to a lower portion 12a (specifically, a lower portion of the inner panel 15) of the side sill 12; a vertical portion 54 that is fixed to the battery pack 20; and a first joint flange 55 that is joined to the battery pack 20.

An outer section of the horizontal portion 53 is fixed to the lower portion 12a of the inner panel 15 by a fastening member 58 such as a bolt and a nut. The vertical portion 54 is formed integrally on an inner section of the horizontal portion 53 and stands upward. The horizontal portion 53 and the vertical portion 54 are formed as a hollow portion 52 having a substantially L shape in a cross-section including a plurality of hollow cells 61. Therefore, the hollow portion 52 is formed to have high rigidity.

The flange portion 42a of the case main body 31 and the flange portion 32a of the case cover 32 are fixed to a top section 62 of the vertical portion 54 by a fastening member 64 such as a bolt and a nut. The vertical portion 54 is interposed between the horizontal portion 53 and the first joint flange 55 in the vehicle width direction and connects the horizontal portion 53 to the first joint flange 55.

The first joint flange 55 is formed integrally with an inner portion 67a in a lower surface section (lower surface) 67 of the vertical portion 54. The first joint flange 55 extends inward in the vehicle width direction from the inner portion 67a. The first joint flange 55 is joined to a case bottom portion (that is, a lower surface of the battery pack 20) 41 of the battery pack 20 from below.

Specifically, the first joint flange 55 has an edge portion 55a on the battery module 24 side (that is, at the inside in the vehicle width direction). The edge portion 55a includes a first joint section 55b that is joined to a lower surface 41a of the case bottom portion 41. The first joint section 55b is joined to the lower surface 41a of the case bottom portion 41 from below by mig welding, laser welding, or the like. That is, the first joint flange 55 is arranged on the lower side of the case bottom portion 41. Therefore, the battery pack 20 and the side sill 12 are connected by the side frame 50.

Figure 6:
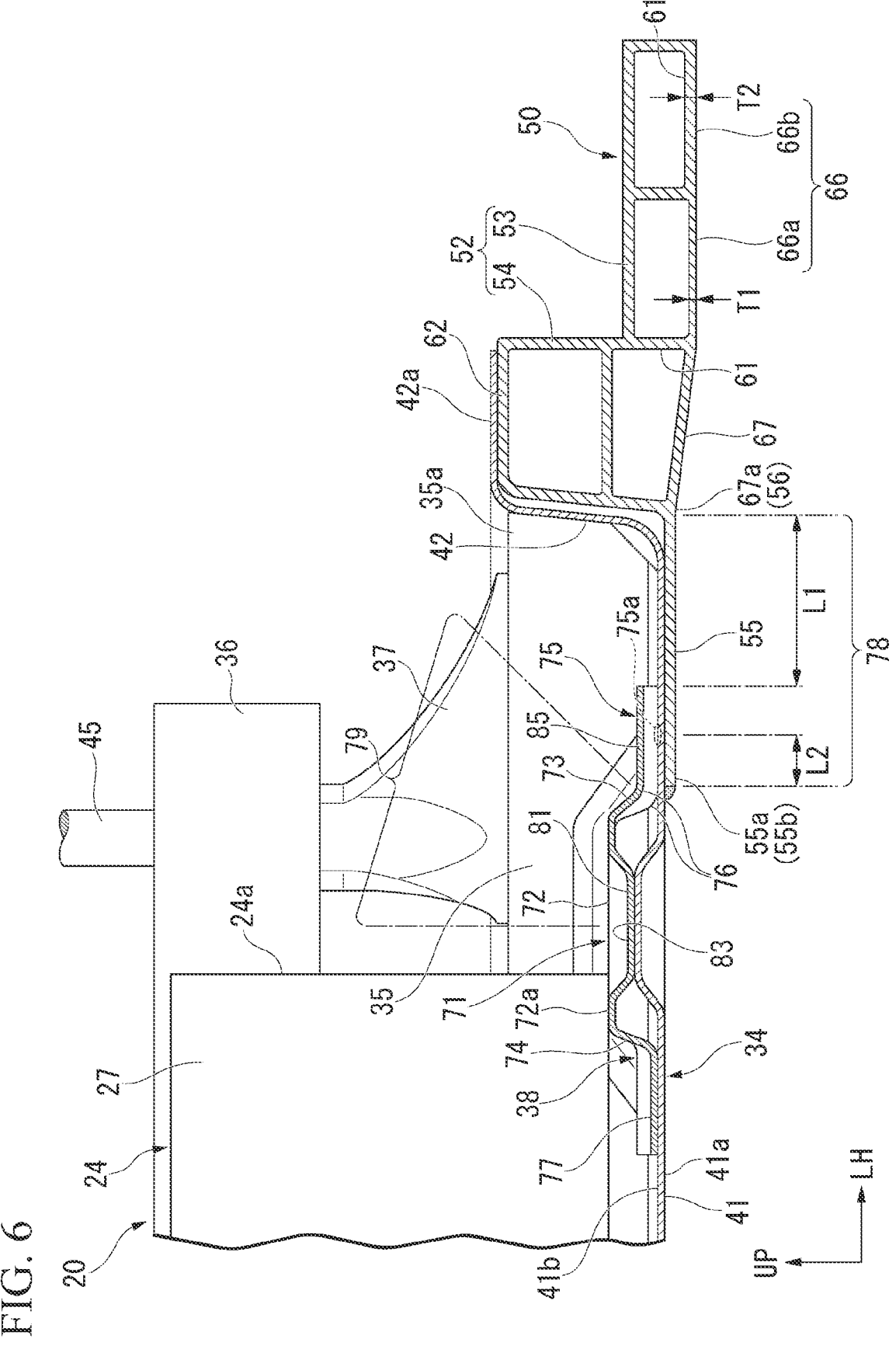
FIG. 6 is a cross-sectional view when seen from an arrow VI direction of FIG. 4.

FIG. 6 is a cross-sectional view when seen from an arrow VI direction of FIG. 4.

As shown in FIG. 2 and FIG. 6, the horizontal portion 53 has a lower surface section (lower surface) 66 formed to be flat on the lower side of the hollow cell 61. The lower surface section 66 includes: an inner region 66a formed at the vertical portion 54 side; and an outer region 66b formed at the outside in the vehicle width direction. The inner region 66a is formed such that a thickness T1 is thinner than a thickness T2 of the outer region 66b.

Further, in the horizontal portion 53, the lower surface section 66 is arranged at a lower position than the case bottom portion 41. In the vertical portion 54, the lower surface section 67 is formed to be inclined at an upward gradient toward the first joint flange 55 from the lower surface section 66 of the horizontal portion 53. Therefore, the first joint flange 55 and the lower surface section 66 of the horizontal portion 53 are connected by the inclined lower surface section 67. The reason the wall thickness T1 of the inner region 66a is formed to be thinner than the wall thickness T2 of the outer region 66b and the reason the lower surface section 66 of the horizontal portion 53 is arranged at a lower position than the case bottom portion 41 will be described in detail later.

<Battery Module>

As shown in FIG. 3 and FIG. 4, the battery module 24 includes: a plurality of front batteries (battery) 27 arranged at a vehicle body forward side of the lower cross member 35 extending in the vehicle width direction; and a plurality of rear batteries (battery) 27 arranged at a vehicle body rearward side of the lower cross member 35. That is, the lower cross member 35 that extends in the vehicle width direction is arranged between the front battery 27 and the rear battery 27.

The front battery 27 and the rear battery 27 are formed in a rectangle shape in plan view and are arranged within battery pack 20 such that the long side is directed in the vehicle forward-rearward direction. A plurality of front batteries 27 and a plurality of rear batteries 27 are arranged in a row in the vehicle width direction, respectively.

The plurality of arranged front batteries 27 and the plurality of arranged rear batteries 27 constitute, for example, the battery module 24 for driving.

The lower cross member 35, the plurality of connection portions 37, and the upper cross member 36 are arranged between the front battery 27 and the rear battery 27. Hereinafter, the front battery 27 and the rear battery 27 may be abbreviated as a "battery 27".

<Battery Frame>

Hereinafter, the battery frame 38 of the case main body 31 and the first joint flange 55 of the side frame 50 are described based on FIG. 4 to FIG. 6.

As shown in FIG. 4 to FIG. 6, the battery frame 38 is connected to the battery 27 of the battery pack 20 and extends in the vehicle forward-rearward direction. The battery frame 38 includes: a protrusion portion 71 that protrudes upward from the case bottom portion 41; a second joint flange 75 that extends from an outer lower end of the protrusion portion 71; a bend portion 76 that is formed on inner end portion in the vehicle width direction of the second joint flange 75; and a third joint flange 77 that extends from an inner lower end of the protrusion portion 71.

The protrusion portion 71 includes: a top section 72 that is arranged to be spaced upward from the case bottom portion 41; an outer surface section 73 that is bent downward from an outer edge of the top section 72; and an inner surface section 74 that is bent downward from an inner side of the top section 72. The outer surface section 73 is a region that forms an outer side surface in the vehicle width direction of the protrusion portion 71. The inner surface section 74 is a region that forms an inner side surface in the vehicle width direction of the protrusion portion 71. The protrusion portion 71 is formed in a U shape in a cross-section of the top section 72, the outer surface section 73, and the inner surface section 74.

The second joint flange 75 extends outward in the vehicle width direction along an upper surface 41b of the case bottom portion 41 from a lower side of the outer surface section 73. The second joint flange 75 is joined to the upper surface 41b of the case bottom portion 41. Therefore, the second joint flange 75 is arranged on an upper side of the case bottom portion 41. The second joint flange 75 is arranged in an overlapping form so as to overlap the upper side of the first joint flange 55 of the side frame 50 in the upward-downward direction via the case bottom portion 41.

A first region in which the first joint flange 55, the case bottom portion 41, and the second joint flange 75 overlap one another is formed to accept deformation with respect to a collision load. A second region in which the first joint flange 55 and the case bottom portion 41 overlap each other is also formed to accept deformation with respect to a collision load. Hereinafter, a region that includes the first region and the second region may be referred to as a "collision absorption portion 78".

The second joint flange 75 is arranged at a position separated by a distance L1 inward in the vehicle width direction relative to the vertical portion 54 (that is, the hollow portion 52) of the side frame 50. A specific example of joining the second joint flange 75 to the upper surface 41b of the case bottom portion 41 will be described in detail later.

The bend portion 76 is located at an intersection between the second joint flange 75 and the outer surface section 73 of the protrusion portion 71. That is, the protrusion portion 71 protrudes upward from the bend portion 76. The edge portion 55a of the first joint flange 55 is arranged below the bend portion 76. In the first joint flange 55, the edge portion 55a on the battery module 24 (battery 27) side extends to the bend portion 76 side. In the edge portion 55a, the first joint section 55b is joined from below to the lower surface 41a of the case bottom portion 41.

The third joint flange 77 extends inward in the vehicle width direction along the upper surface 41b of the case bottom portion 41 from a lower side of the inner surface section 74. The third joint flange 77 is joined to the upper surface 41b of the case bottom portion 41.

The battery frame 38 is formed in a hat shape in a cross-section of the protrusion portion 71, the second joint flange 75, and the third joint flange 77.

The second joint flange 75 and the third joint flange 77 are joined to the upper surface 41b of the case bottom portion 41, and thereby, the battery frame 38 is fixed to the upper surface 41b of the case bottom portion 41. In this state, the protrusion portion 71 forms a hollow cross-section (hollow closed cross-section) together with the case bottom portion 41. Therefore, the rigidity of the protrusion portion 71 is enhanced.

The protrusion portion 71 includes a plurality of recess sections 81 along the vehicle forward-rearward direction. The plurality of recess sections 81 are formed to be recessed downward from the top section 72 of the protrusion portion 71. The plurality of recess sections 81 are arranged to be spaced from each other in the vehicle forward-rearward direction. The top section 72 is located at a middle position in the vehicle width direction in the protrusion portion 71. Therefore, the rigidity of a region on the middle side in the width direction of the protrusion portion 71 is enhanced. The plurality of recess sections 81 are joined to a raised portion 83 of the case bottom portion 41 by spot welding or the like from above.

Here, the hollow portion 52 of the side frame 50 is formed to have high rigidity. That is, the protrusion portion 71 and the hollow portion 52 are formed to have higher rigidity than the collision absorption portion 78 between the protrusion portion 71 and the hollow portion 52 in the vehicle width direction. The collision absorption portion 78 is a region that accepts deformation with respect to a collision load which is input, for example, by a side collision. Therefore, when the collision load is input to the side frame 50, the collision absorption portion 78 interposed between the hollow portion 52 having high rigidity and the protrusion portion 71 having high rigidity can be suitably deformed by the collision load.

In the top section 72 of the protrusion portion 71, the battery module 24 (battery 27) is fastened to a vehicle width direction inner end section (that is, a vehicle width direction inner end section of the protrusion portion 71) 72a. That is, the battery module 24 is arranged within the battery pack 20 in a state of being supported by the vehicle width direction inner end section 72a of the protrusion portion 71.

The battery frame 38 includes a plurality of ridge lines 85 that continue to the outer surface section 73 and the second joint flange 75, extend in the vehicle width direction, and are spaced from each other in the vehicle forward-rearward direction. The plurality of ridge lines 85 are formed in a bead shape that is raised (protrudes) to an opposite side of the case bottom portion 41 from the outer surface section 73 and the second joint flange 75.

The second joint flange 75 includes a second joint section 75a between the ridge lines 85 that are adjacent to each other in the vehicle forward-rearward direction. The plurality of second joint sections 75a are arranged to be in contact with the upper surface 41b of the case bottom portion 41. The plurality of second joint sections 75a are joined to the upper surface 41*b* of the case bottom portion 41 by spot welding or the like. Here, the first joint section 55*b* of the first joint flange 55 is arranged to be separated by a distance L2 to the battery module 24 (battery 27) side from the second joint section 75*a* of the second joint flange 75.

The actions and effects of the vehicle body lower part structure according to the above-described embodiment are described.

Figure 7:
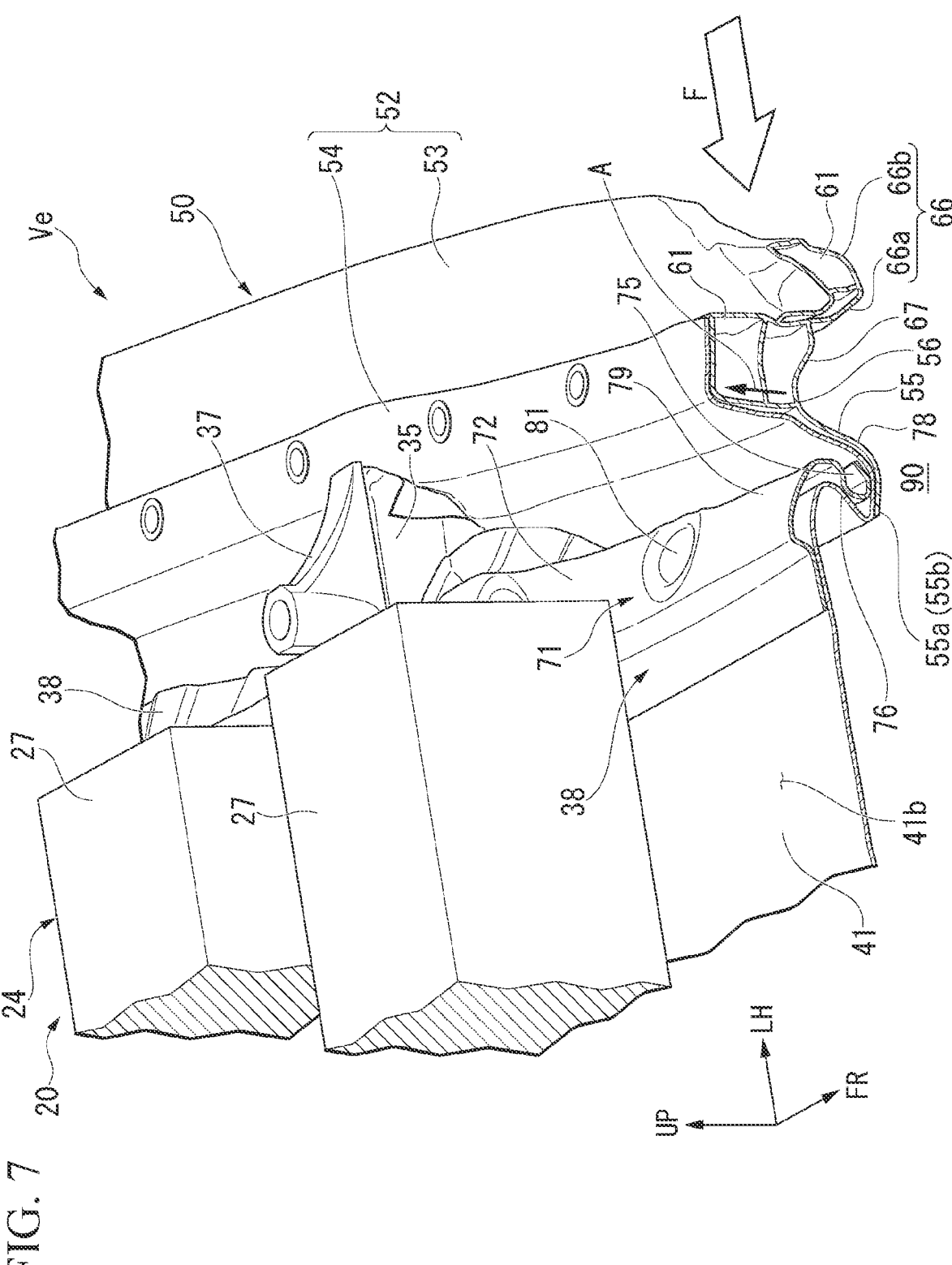
FIG. 7 is a perspective view including a partial cross-section showing a state in which a collision load is input by a side collision to the vehicle body lower part structure in the embodiment of the present invention.

FIG. 7 is a perspective view including a partial cross-section showing a state in which a collision load F is input by a side collision to the vehicle body lower part structure.

As shown in FIG. 4 and FIG. 7, for example, when the collision load F is input to the side sill 12 (refer to FIG. 2) by a side collision such as a pole side collision, the input collision load F is transmitted to the side frame 50. The collision load F transmitted to the side frame 50 is transmitted to the first joint flange 55 via the hollow portion 52. Hereinafter, the side collision such as a pole side collision may be simply abbreviated as a "side collision".

The collision load F is transmitted to the first joint flange 55, and thereby, the collision load F is transmitted to the collision absorption portion 78. The collision absorption portion 78 is a region that accepts deformation with respect to the collision load F. Here, the second joint flange 75 of the battery frame 38 is arranged so as to overlap the upper side of the first joint flange 55 in the upward-downward direction. Therefore, when the collision load F is input to the first joint flange 55, the first joint flange 55 can be pressed by the second joint flange 75 from above. Thereby, the collision absorption portion 78 can be deformed downward.

It is possible to ensure a space 90 that receives deformation of the collision absorption portion 78 below the collision absorption portion 78. Therefore, it is possible to prevent a section that is not collapsed from being generated at the collision absorption portion 78, and it is possible to enhance the absorption efficiency of collision energy. Further, the collision absorption portion 78 is deformed downward, and thereby, it is possible to prevent the collision absorption portion 78 from coming into contact with the battery 27 arranged within the battery pack 20 (that is, above the case bottom portion 41).

Thereby, it is possible to efficiently absorb the collision energy while preventing damage to the mounted battery 27 at the time of input of the collision load F. Therefore, according to the present vehicle body lower part structure, it is possible to improve collision safety performance, and it is possible to contribute to the development of a sustainable transportation system.

As shown in FIG. 6 and FIG. 7, the edge portion 55*a* of the first joint flange 55 extends to the bend portion 76 side (that is, to the inside in the vehicle width direction) of the battery frame 38. The first joint section 55*b* (also refer to FIG. 4) of the edge portion 55*a* is joined to the lower surface 41*a* of the case bottom portion 41. Therefore, the collision load F can be transmitted to the bend portion 76 of the battery frame 38 and the case bottom portion 41.

Thereby, the bend portion 76 can be a base point of folding with respect to the collision load F. It is possible to further reliably deform (bend) the first joint flange 55 downward together with the battery frame 38 (specifically, the second joint flange 75) and the case bottom portion 41.

The second joint section 75*a* (also refer to FIG. 4) of the second joint flange 75 is joined to the upper surface 41*b* of the case bottom portion 41. The first joint section 55*b* is arranged closer to the battery 27 (that is, at the inside in the vehicle width direction) than the second joint section 75*a*. The second joint flange 75 is arranged at the upper side of the case bottom portion 41, and the first joint flange 55 is arranged at the lower side of the case bottom portion 41. Thereby, it is possible to prevent the first joint flange 55 and the case bottom portion 41 from coming into contact directly with the battery 27.

Specifically, for example, it is also conceivable that when an excessive collision load is input to the first joint flange 55 of the side frame due to the side collision, the first joint flange 55 may be deformed upward. Even in this case, the edge portion 55*a* (that is, the first joint section 55*b*) is in contact with the battery frame 38 via the case bottom portion 41. Therefore, the battery frame 38 can prevent the first joint flange 55 from being greatly deformed upward. Thereby, it is possible to protect the battery 27 by the battery frame 38.

Additionally, the battery 27 is fastened to the inside in the vehicle width direction of the protrusion portion 71. Therefore, at the time of a side collision, a region 79 of the protrusion portion 71 from a middle side in the vehicle width direction to the outside in the vehicle width direction can be bent in a mountain fold. Thereby, when the first joint flange 55 is deformed downward, and the edge portion 55*a* is folded in a valley form, the protrusion portion 71 can be bent in a mountain fold in cooperation with the valley fold of the edge portion 55*a*. That is, downward deformation of the case bottom portion 41 by the outside region (that is, the collision absorption portion 78) of the battery 27 can be preferably guided. Accordingly, it is possible to enhance the absorption efficiency of the collision energy by the collision absorption portion 78, and it is possible to suitably prevent the collision absorption portion 78 from coming into contact with the battery 27.

The recess section 81 that is joined to the raised portion 83 of the case bottom portion 41 is provided on the top section 72 of the protrusion portion 71, and thereby, the recess section 81 can be arranged at the middle side in the width direction of the protrusion portion 71. Therefore, the rigidity at the middle side in the width direction of the protrusion portion 71 can be enhanced by the recess section 81, and it is possible to provide a strength difference relative to the outer region (that is, a region on the bend portion 76 side) in the width direction. Thereby, the bend portion 76 can be further reliably used as a base point of folding, and the first joint flange 55 can be further reliably deformed (bent) downward.

As shown in FIG. 4 and FIG. 7, the plurality of ridge lines 85 are formed on the battery frame 38 continuously to the second joint flange 75 and the outer surface section 73 of the protrusion portion 71. The plurality of ridge lines 85 are arranged to be spaced from each other in the vehicle forward-rearward direction. Therefore, the plurality of ridge lines 85 can enhance the rigidity of the second joint flange 75 against the collision load F input by a side collision. Thereby, it is possible to increase the absorption amount of the collision energy by the collision absorption portion 78 including the second joint flange 75.

As shown in FIG. 6 and FIG. 7, the horizontal portion 53 and the vertical portion 54 of the side frame 50 are formed as the hollow portion 52 having a substantially L shape in a cross-section. The hollow portion 52 includes the plurality of hollow cells 61. The hollow portion 52 is formed to have high rigidity against the collision load F input by a side collision. Therefore, by separating the second joint flange 75 of the battery frame 38 by the distance L1 inward in the vehicle width direction relative to the vertical portion 54 (that is, the hollow portion 52), the battery frame 38 and the hollow portion 52 can be spaced from each other. Thereby, it is possible to suitably ensure a deformation margin of the collision absorption portion 78 against the collision load F input by a side collision, and it is possible to further increase the absorption amount of the collision energy.

Further, the thickness T1 of the inner region 66*a* is formed to be thinner than the thickness T2 of the outer region 66*b*.

Therefore, when the collision load F is input by a side collision, the inner region 66*a* on the vertical portion 54 side can be actively deformed at the lower surface section 66 of the horizontal portion 53 by the collision load F. Accordingly, a boundary portion 56 between the vertical portion 54 and the first joint flange 55 can be deformed upward as indicated by an arrow A by the collision load F. The boundary portion 56 is a region that substantially corresponds to the inner portion 67*a* of the lower surface section 67 in the vertical portion 54.

In this way, by deforming the boundary portion 56 upward as indicated by the arrow A by the collision load F, the side frame 50 can be suitably deformed, and it is possible to further increase the absorption amount of the collision energy.

Additionally, the lower surface section 66 of the horizontal portion 53 is arranged at a lower position than the case bottom portion 41. Therefore, it is possible to prevent the hollow portion 52 of the side frame 50 from falling to the room inside (that is, inward in the vehicle width direction) by the collision load F input by a side collision. Thereby, the first joint flange 55 of the side frame 50 can be further reliably deformed downward.

As shown in FIG. 3, FIG. 6, and FIG. 7, the battery 27 is arranged within the battery pack 20 such that the long side of the battery 27 is directed in the vehicle forward-rearward direction. Therefore, for example, the size in the vehicle width direction of the battery 27 can be small compared to the case where batteries of the same number and the same size are arranged such the long side is directed in the vehicle width direction. That is, the size in the vehicle width direction of the battery 27 can be short without reducing the battery capacity of the battery 27.

Thereby, it is possible to ensure a long deformation stroke of the collision absorption portion 78 located between the hollow portion 52 of the side frame 50 and the battery 27. Further, by the support member of the battery 27 being small in the vehicle width direction, it is possible to reduce the weight of the vehicle Ve (refer to FIG. 1), and by ensuring the battery capacity of the battery 27, it is possible to sufficiently ensure a cruising distance of the vehicle Ve.

The technical scope of the present invention is not limited to the embodiments described above, and various changes can be made without departing from the scope of the present invention.

The components in the embodiments described above can be appropriately replaced with well-known components without departing from the scope of the present invention, and the modification examples described above may be suitably combined.

What is claimed is:

1. A vehicle body lower part structure, comprising:
a side frame that connects a side sill to a battery pack that is arranged below a floor portion; and
a battery frame that supports a battery within the battery pack, wherein a first joint flange that is joined to the battery pack of the side frame is arranged such that a second joint flange that is joined to the battery pack of the battery frame overlaps an upper side in an upward-downward direction of the first joint flange, wherein the battery frame comprises a protrusion portion that protrudes upward from a bend portion formed on an inner end portion in a vehicle width direction of the second joint flange, wherein an edge portion on the battery side of the first joint flange extends to a bend portion side, and wherein the edge portion comprises a first joint section that is joined to the battery pack.

2. The vehicle body lower part structure according to claim 1, wherein the second joint flange comprises a second joint section that is joined to the battery pack, and the first joint section is arranged closer to the battery than the second joint section.

3. The vehicle body lower part structure according to claim 1, wherein the battery frame forms a hollow cross-section together with the battery pack at the protrusion portion, and the battery is fastened to an inner end section in the vehicle width direction of the protrusion portion of the battery frame.

4. The vehicle body lower part structure according to claim 3, wherein the protrusion portion of the battery frame comprises a plurality of recess sections that are joined to the battery pack along a vehicle forward-rearward direction.

5. The vehicle body lower part structure according to claim 1, wherein the battery frame comprises a plurality of ridge lines that continue to the second joint flange and an outer surface section on an outside in the vehicle width direction of the protrusion portion, extend in the vehicle width direction, and are spaced from each other in a vehicle forward-rearward direction.

6. The vehicle body lower part structure according to claim 1, wherein the side frame comprises: a horizontal portion that is fixed to a lower portion of the side sill; and a vertical portion that connects the horizontal portion to the first joint flange, the horizontal portion and vertical portion are formed as hollow portions having a substantially L shape in a cross-section including a plurality of hollow cells, and the second joint flange of the battery frame is arranged at a position that is separated inward in a vehicle width direction from the vertical portion.

7. The vehicle body lower part structure according to claim 6, wherein a lower surface of the horizontal portion is formed such that a thickness of an inner region formed on the vertical portion side is thinner than an outer region formed on an outside in the vehicle width direction.

8. The vehicle body lower part structure according to claim 6, wherein a lower surface of the horizontal portion is arranged at a lower position than a lower surface of the battery pack,
a lower surface of the vertical portion is formed in an inclination form having an upward gradient toward the first joint flange from the lower surface of the horizontal portion, and
the lower surface of the vertical portion connects the lower surface of the horizontal portion to the first joint flange.

9. The vehicle body lower part structure according to claim 1, wherein the battery is formed in a rectangle shape in plain view and is arranged within the battery pack such that a long side is directed in a vehicle forward-rearward direction.

\* \* \* \* \*